US006948258B2

United States Patent
Coulombe

(10) Patent No.: US 6,948,258 B2
(45) Date of Patent: Sep. 27, 2005

(54) DEVICE FOR MEASURING THE INTERNAL DIAMETER OF A PIPE

(76) Inventor: Normand Coulombe, 1056 rue Viger, Ste-Foy (CA), G1W 2P7

( * ) Notice: Subject to any disclaimer, the term of this patent is extended or adjusted under 35 U.S.C. 154(b) by 33 days.

(21) Appl. No.: 10/687,090

(22) Filed: Oct. 17, 2003

(65) Prior Publication Data

US 2005/0081396 A1 Apr. 21, 2005

(51) Int. Cl.[7] ................................................. G01B 3/00
(52) U.S. Cl. .......................... 33/542; 33/543; 33/555.1; 33/738; 33/760
(58) Field of Search ....................... 33/542, 543, 555.1, 33/555.4, 733, 738, 760, 544, 227–228

(56) References Cited

U.S. PATENT DOCUMENTS

| | | | | |
|---|---|---|---|---|
| 4,181,848 A | * | 1/1980 | Iwase | 33/763 |
| 4,281,929 A | * | 8/1981 | Lord et al. | 356/241.1 |
| 4,348,812 A | * | 9/1982 | Middleton | 33/794 |
| 4,407,071 A | * | 10/1983 | Boeder et al. | 33/544.1 |
| 4,922,622 A | * | 5/1990 | Galloway | 33/542 |
| 5,355,128 A | * | 10/1994 | Riordan | 340/854.7 |
| 5,581,901 A | * | 12/1996 | Takahashi | 33/756 |
| 5,685,082 A | * | 11/1997 | Proulx | 33/286 |
| 5,727,327 A | * | 3/1998 | Wakabayashi et al. | 33/520 |
| 6,580,449 B1 | * | 6/2003 | Meltzer | 348/85 |
| 2002/0166396 A1 | * | 11/2002 | McGrew | 73/865.8 |

* cited by examiner

Primary Examiner—Christopher W. Fulton
Assistant Examiner—Yaritza Guadalupe

(57) ABSTRACT

A device being used for measuring the internal diameter of a pipe, which including a tape mounted into a flat elongated body having holes to allow a string to be pulled out of the flat elongated body. The tape includes hole at a first end for connecting a first end of an elastic band and the string to the tape. The flat elongated body includes a tongue having hole for connecting a second end of the elastic band. The string pulls the tape out of the flat elongated body for measuring the internal diameter of the pipe. The tape includes also hole at a second end for connecting a circular member keeping the device at a right angle in bottom of the pipe when reading the diameter of the pipe with the inspection camera, and also blocking the tape at the input of the flat elongated body when the elastic band bringing the tape into the elongated body.

4 Claims, 4 Drawing Sheets

DEVICE FOR MEASURING THE INTERNAL DIAMETER OF A PIPE

BACKGROUND OF THE INVENTION

1. Field of the Invention

More particularly, the present invention relates to a device being used for measuring the internal diameter of a pipe.

2. Description of the Related Art

A search of prior art record has unveiled the following patents:

1. CA 2,046,492 registered in 1991 to Barski;
2. CA 1,134,872 issued in 1982 to Passamoni;
3. CA 2,218,436 registered in 1942 to Wiercienski;
4. CA 512,624 issued in 1955 to Bissell;
5. CA 438,857 issued in 1946 to Levin;
6. CA 2,074,640 registered in 1992 to Rafilipomanana; and
7. CA 2,278,046 registered in 1997 to Prakken.

As can be seen the patents mentioned above are probably the most relevant.

SUMMARY OF THE INVENTION

It has been discovered that the present invention described herein allows to measure the internal diameter of a pipe, which includes a tape mounted into a flat elongated body having holes to allow a string to be pulled out of a flat elongated body. The tape includes hole at a first end for connecting a first end of an elastic band and the string to the tape.

The flat elongated body includes a tongue having hole for connecting a second end of the elastic band. The string pulls a tape out of the flat elongated body for measuring the internal diameter of the pipe.

Still, the tap includes also hole at a second end for connecting a circular member keeping the device at a right angle in bottom of the pipe when reading the diameter of the pipe with the inspection camera, and also blocking the tape at the input of the flat elongated body when the elastic band bringing the tape into the elongated body.

A metal part is disposed between the flat elongated body and a wire of the inspection camera for keeping the device in bottom of the pipe.

A multitude of mechanical fasteners are mounted to the flat elongated body for fastening the inspection camera, and for extending the flat elongated body one can connected an extension body at one end of the flat elongated body.

BRIEF DESCRIPTION OF THE SEVERAL VIEWS OF THE DRAWING(S)

DETAILED DESCRIPTION OF THE INVENTION

Figure 1:
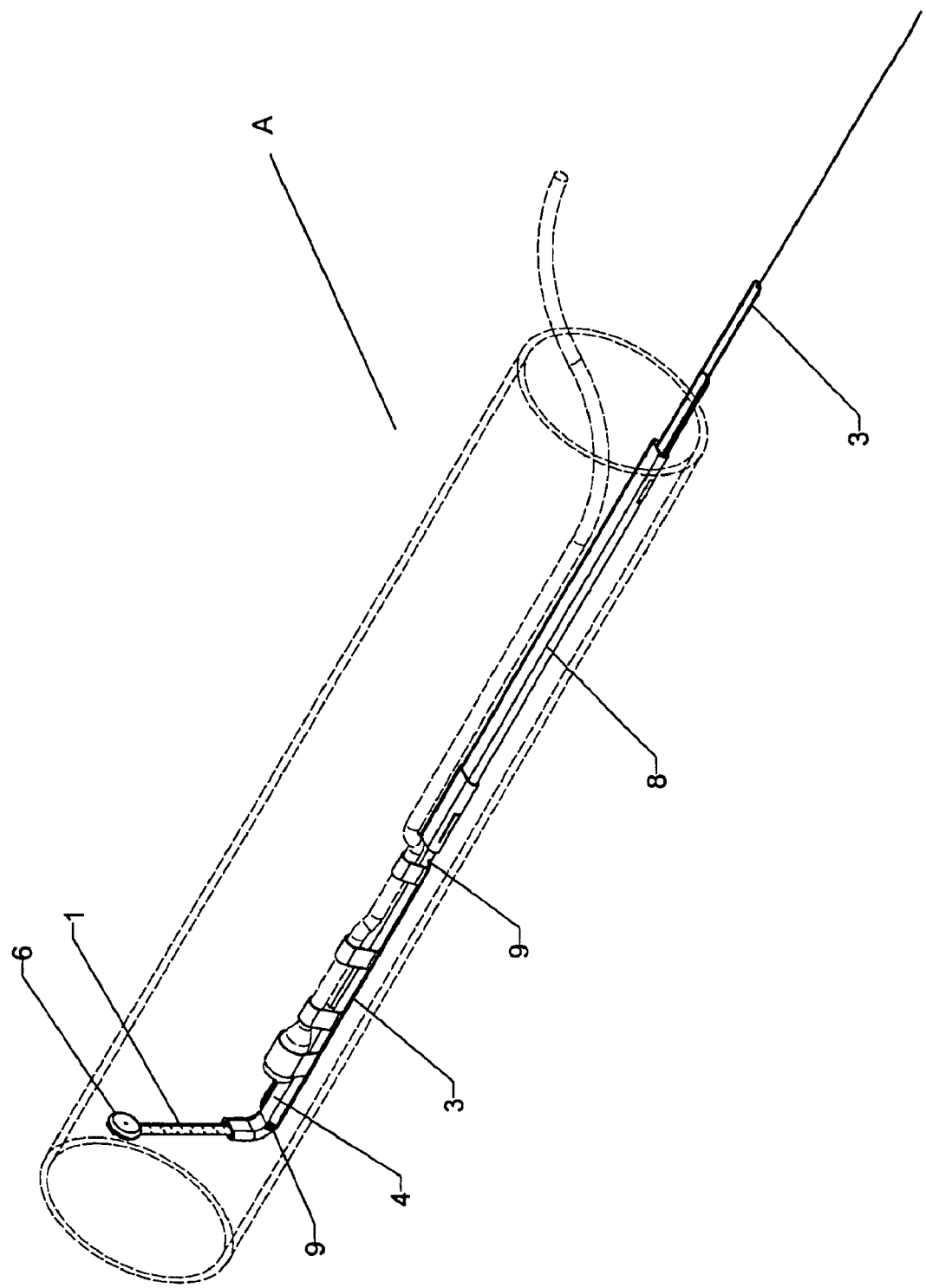
FIG. 1 is a perspective view of a device being used for measuring the internal diameter of a piper—as shown in phantom lines.
Figure 2:
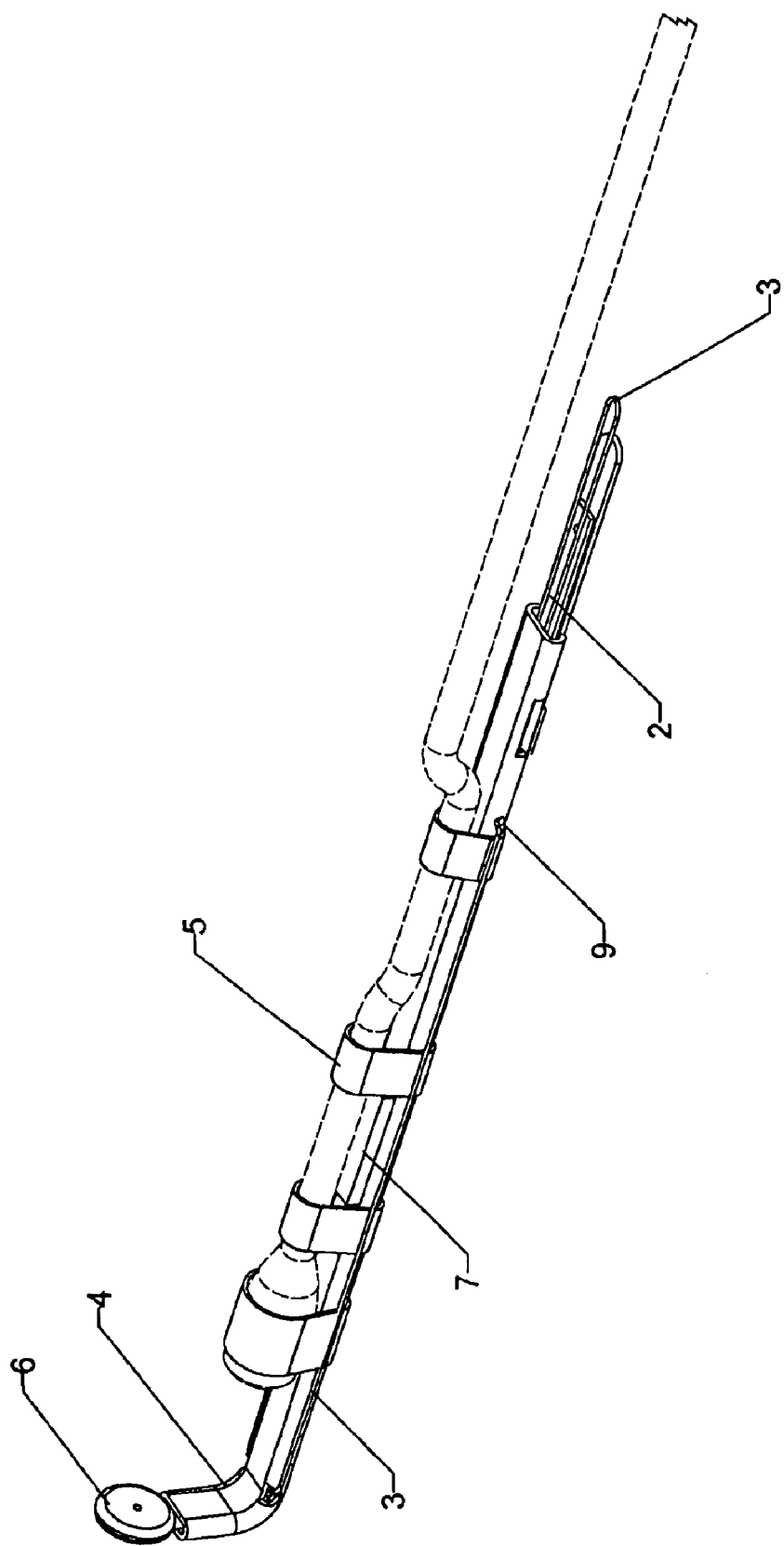
FIG. 2 is a perspective view of the device being used for measuring the internal diameter of a pipe.
Figure 3:
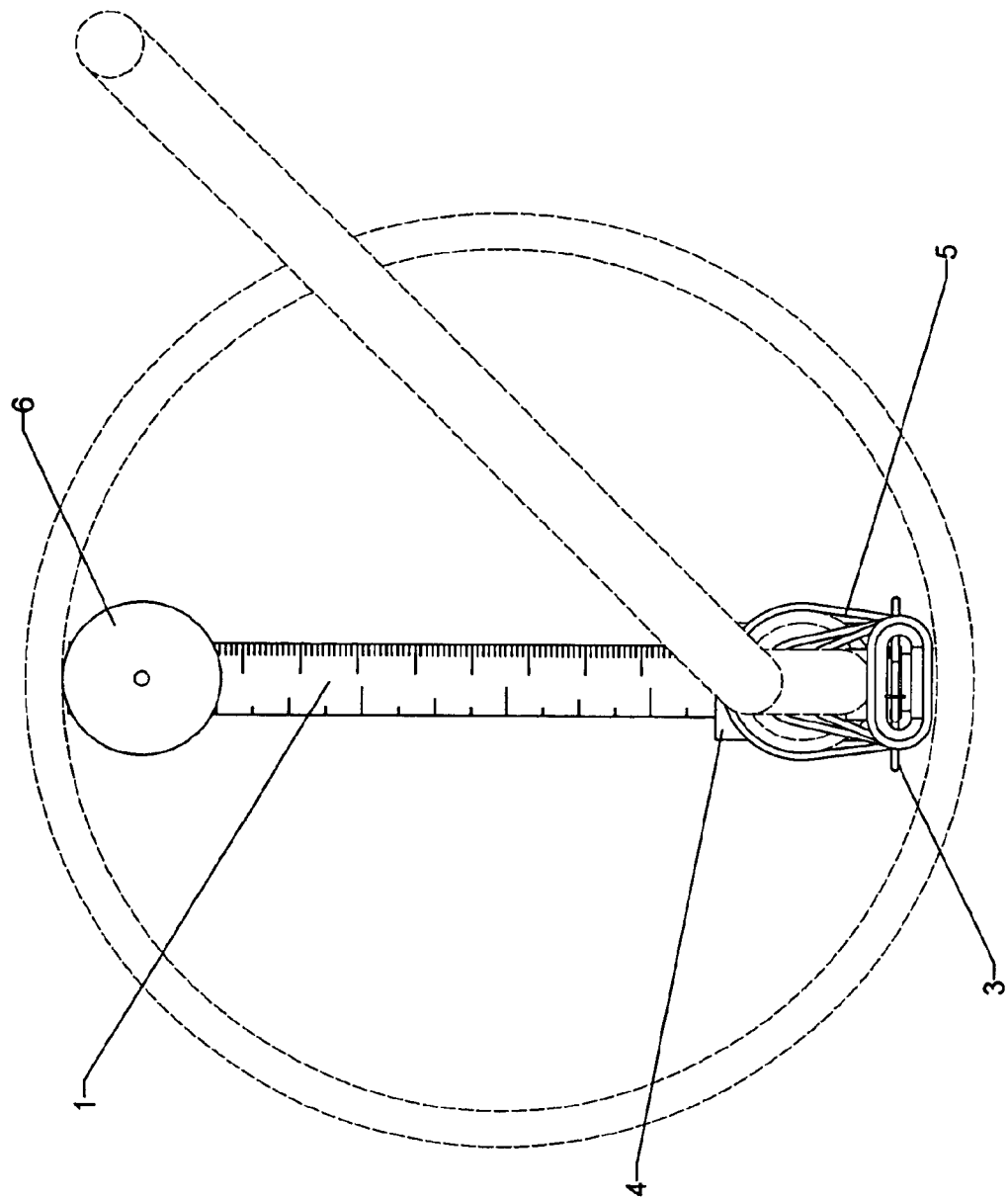
FIG. 3 is a front view thereof.
Figure 4:
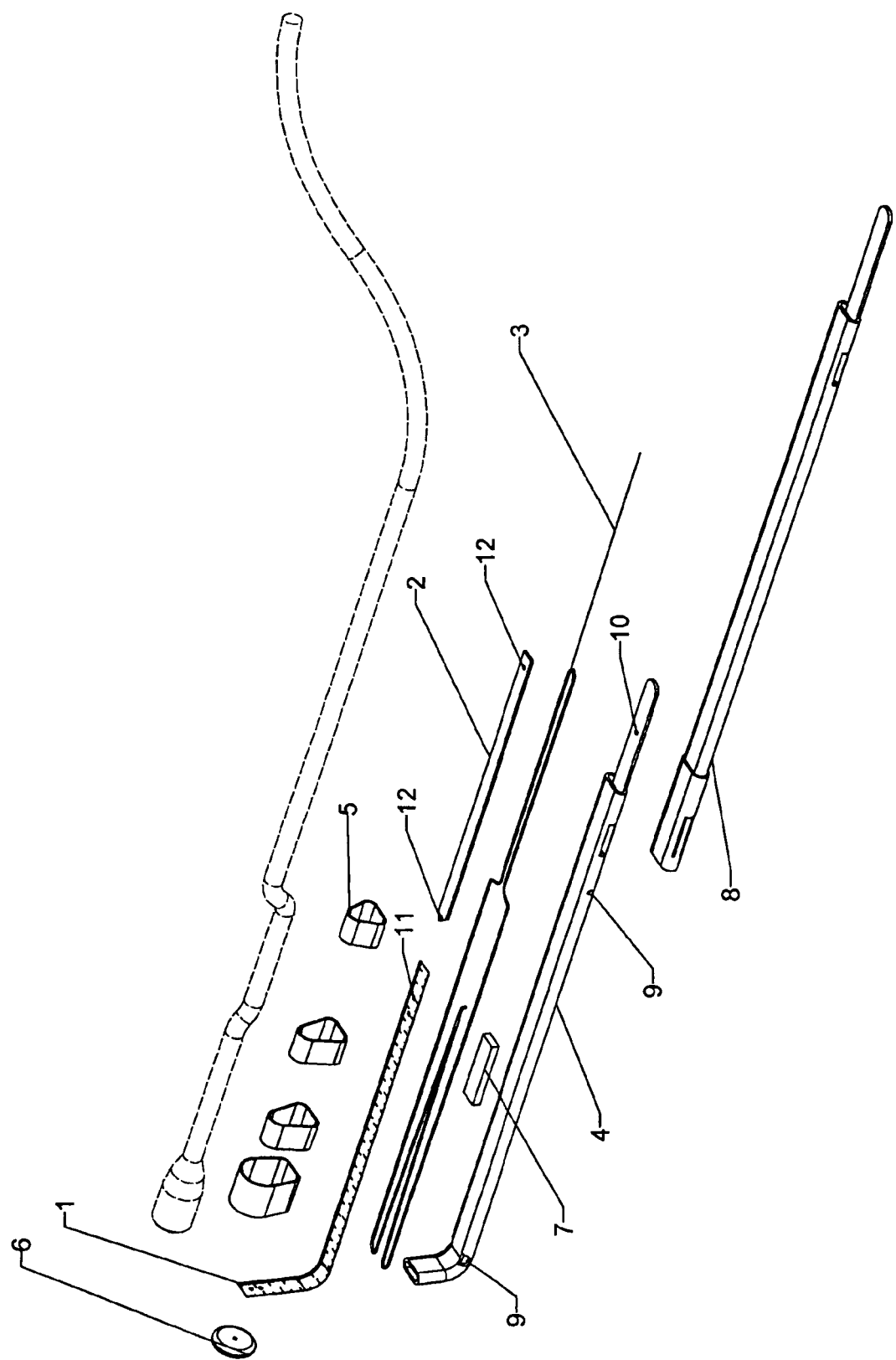
FIG. 4 is an exploded view thereof.

Referring to FIGS. 1 and 4, a device (A) being used for measuring the internal diameter of a pipe, which comprises a tape (1) mounted into a flat elongated body (4) having holes (9) to allow to a string (3) to be pulled out of the elongated body (4).

The tape (1) includes hole (11) at a first end for using a means (12) connecting a first end of an elastic band (2) and the string (3) to the tape (1). The flat elongated body (4) includes a tongue having hole (10) for connecting a second end of the elastic band (2). The string (3) pulls the tape (1) out of the flat elongated body (4) for measuring the internal diameter of the pipe.

Still, the tape (1) includes also hole at a second end for connecting a circular member (6) keeping the device at a right angle in bottom of the pipe when reading the diameter of the pipe with the inspection camera, and also blocking the tape (1) at the input of the flat elongated body (4) when the elastic band (2) bringing the tape (1) into the elongated body (4).

A metal part (7) is disposed between the elongated body (4) and a wire of the inspection camera for keeping the device (A) in bottom of the pipe.

A plurality of mechanical fasteners (5) are mounted to the flat elongated body (4) for fastening the inspection camera—as shown in phantom lines-, and for extending the flat elongated body (4) one can connected an extension body (8) at one end of the flat elongated body (4) (see FIG. 1).

Although only a single embodiment of the present invention has been described and illustrated, the present invention is not limited to the features of this embodiment, but includes all variations and modifications within the scope of claims attached hereto without departing from the spirit of the invention.

What is claimed is:

1. A device for measuring the internal diameter of a pipe, said device comprising:
    means for fastening the device to an inspection camera;
    a tape mounted into a flat elongated body having holes to allow a string to be pulled out of said flat elongated body,
    the tape having a first end and a second end,
    wherein said tape has a hole at the first end for connecting a first end of an elastic band and the string to said tape,
    wherein the flat elongated body includes a tongue having a hole for connecting a second end of the elastic band,
    wherein said string pulls said tape out of said flat elongated body for measuring the internal diameter of the pipe,
    wherein said tape has a hole at the second end for connecting a circular member keeping said device at a right angle in bottom of the pipe when reading the diameter of the pipe with the inspection camera, and also blocking said tape at the input of said flat elongated body when said elastic band brings said tape into said elongated body; and
    means for keeping said device in the bottom of the pipe; and
    means for extending said flat elongated body.

2. The device according to claim 1, wherein said means for fastening said device to an inspection camera comprises a plurality of mechanical fasteners mounted to said flat elongated body.

3. The device according to claim 1, wherein said means for keeping said device in the bottom of the pipe comprises a metal part disposed between said flat elongated body and a wire of the inspection camera.

4. The device according to claim 1, wherein said means for extending said flat elongated body comprises an extension body connected at one end of said flat elongated body.

* * * * *